(12) United States Patent
Mayance

(10) Patent No.: US 6,676,019 B2
(45) Date of Patent: Jan. 13, 2004

(54) ELECTRONIC CHIP FOR A PORTABLE OBJECT

(75) Inventor: Frederic Mayance, Ormes (FR)

(73) Assignee: Schlumberger Systemes, Montrouge (FR)

(*) Notice: Subject to any disclaimer, the term of this patent is extended or adjusted under 35 U.S.C. 154(b) by 0 days.

(21) Appl. No.: 10/181,066

(22) PCT Filed: Jan. 11, 2001

(86) PCT No.: PCT/FR01/00076
§ 371 (c)(1),
(2), (4) Date: Jul. 12, 2002

(87) PCT Pub. No.: WO01/52186
PCT Pub. Date: Jul. 19, 2001

(65) Prior Publication Data
US 2002/0190122 A1 Dec. 19, 2002

(30) Foreign Application Priority Data
Jan. 12, 2000 (FR) .............................. 00 00320

(51) Int. Cl.[7] .............................. G06K 7/08; G06K 7/10; G06K 5/00
(52) U.S. Cl. .................. 235/451; 235/377; 235/380; 713/502; 714/55
(58) Field of Search .................. 235/451, 377, 235/380, 382, 493, 375, 492; 713/400, 500, 501, 502, 503, 600, 601; 714/55

(56) References Cited

U.S. PATENT DOCUMENTS

| | | | | |
|---|---|---|---|---|
| 4,710,613 A | * | 12/1987 | Shigenaga | 235/380 |
| 4,808,802 A | * | 2/1989 | Kano | 235/380 |
| 4,908,038 A | * | 3/1990 | Matsumura et al. | 235/380 |
| 5,070,233 A | * | 12/1991 | Takizawa et al. | 235/380 |
| 5,146,068 A | * | 9/1992 | Ugawa et al. | 235/441 |
| 5,247,163 A | * | 9/1993 | Ohno et al. | 235/492 |
| 5,537,584 A | * | 7/1996 | Miyai et al. | 714/42 |
| 5,644,702 A | * | 7/1997 | Nishioka | 714/22 |
| 5,790,842 A | * | 8/1998 | Charles et al. | 713/600 |
| 6,125,452 A | * | 9/2000 | Kuriyama | 713/600 |
| 6,157,966 A | * | 12/2000 | Montgomery et al. | 710/8 |

FOREIGN PATENT DOCUMENTS

JP     2002109238 A    *   4/2002

* cited by examiner

Primary Examiner—Karl D. Frech
Assistant Examiner—Daniel I Walsh
(74) Attorney, Agent, or Firm—Leonard W. Pojunas; John Ryberg

(57) ABSTRACT

The electronic chip (10) comprises an interface (11) enabling it to communicate with a terminal and a processing circuit (13) capable of performing processing when the chip communicates with the terminal. A time base circuit (18) is connected to the processing circuit (13) for generating a first signal (SI) during at least one given moment if processing has not yet been completed at said moment. A restart signal (SR) is transmitted to the interface in response to the first signal with the purpose of indicating to the terminal that the chip is still operating.

15 Claims, 3 Drawing Sheets

ELECTRONIC CHIP FOR A PORTABLE OBJECT

FIELD OF THE INVENTION

This invention concerns, generally, an electronic chip for a portable object such as a smartcard.

BACKGROUND OF THE INVENTION

The smartcards are currently extremely successful. They are used in sectors as varied as banking, health, telephony, etc. The electronic chip in the smartcard incorporates one or more memories, in order to store data specific to the card user, such as a bank account number, the user's social security number, the number of remaining telephone units, etc.

Some smartcards, in particular those used in the banking sector, include a microprocessor type processing circuit, including a source code capable of carrying out relatively complex operations. These operations consist, for example, of implementing encryption algorithms to protect secret information contained in the card, or organising data files. Generally, such operations are carried out after a command is sent by a card read and/or write terminal.

FIG. 1 illustrates a smartcard 1, including an electronic chip 1a, designed to co-operate with a terminal or read and/or write device 2. The terminal 2 can communicate with the electronic chip 1a, in particular to read or write data in it, when the card 1 is inserted in a slot 2a of the terminal provided for this purpose. In addition, the terminal 2 supplies the chip 1a with electrical power.

Consequently, once the connection is set up between the chip 1a and the terminal 2, the latter can send a command to the chip, such as a read command, to make it execute a particular processing operation. However, after sending the command, the terminal 2 expects the chip 1a to reply within a given time interval. If, on expiry of this time interval, the terminal 2 has not received any reply from the chip 1a, it generally considers that the latter is no longer operating or that it has been withdrawn from the terminal. The standard ISO 7816-3, concerning a transmission protocol for smartcards, defines a "working time-out" corresponding to the maximum time allocated to the smartcard to reply to the terminal. On expiry of this working time-out, if it is still executing a processing operation, the card can transmit a restart byte to indicate to the terminal that it is still operating. Once the restart byte has been received by the terminal, the card has a further time interval before replying and can transmit other restart characters if necessary.

In conventional smartcards, the operation to transmit restart bytes is programmed in the microprocessor. To do this, commands are inserted at specific positions in the source code to be executed by the microprocessor. When, during a given processing operation, the microprocessor detects one of these commands, it interrupts the said processing to send a restart byte to the terminal.

This technique has a major disadvantage, since the time required for each operation to be carried out by the microprocessor must be planned in advance, i.e. when writing the source code. If, for example, the specific commands are too far apart from each other in the source code, the maximum response time authorised by the standard ISO 7816-3 may be exceeded during a processing operation which takes longer than planned to execute. In this case, there is a strong likelihood that the terminal, considering that the smartcard is not operating, switches off the electricity supply to the card, resulting in a possible loss of data or files in the card. If on the contrary the specific commands are too near each other in the source code, the microprocessor is obliged to interrupt the processing numerous times, which reduces the card execution speed.

Generally, it is extremely difficult to estimate the time required by the card microprocessor to execute the source code, since this time usually depends on initial, variable conditions.

In this context, it is easy to understand that there is a need for an electronic chip which can reply reliably to a terminal within an allocated time interval, without having too much impact on the speed of the processing operation(s) implemented by the chip.

SUMMARY OF THE INVENTION

The purpose of this invention, in particular, is to supply an electronic chip which can meet this requirement.

Consequently, an electronic chip is provided which comprises an interface enabling it to communicate with a terminal and a processing circuit capable of performing processing after a link has been set up between the chip and the terminal, characterised in that it also comprises a time base circuit, connected to the processing circuit, for generating a first signal during at least one given moment if processing has not yet been completed at the said moment, and a means of transmitting to the interface, in response to the first signal, a second signal with the purpose of indicating to the terminal that the chip is still operating.

Thus, according to this invention, the moment(s) when a restart signal must be sent to the terminal are determined by a time base circuit separate from the processing circuit. These moments are therefore independent of the processing duration implemented by the processing circuit, so that the terminal will receive restart signals in time, irrespective of the processing complexity.

In practice, the processing circuit is adapted to activate the time base circuit approximately at the start of the processing. "Approximately at the start of the processing" means that the processing circuit is activated shortly before or after the processing circuit starts to execute the processing. Similarly, the processing circuit is adapted to deactivate the time base circuit approximately at the end of the processing.

Typically, between the time when it is activated by the processing circuit and the time when it is deactivated, the time base circuit generates the first signal periodically. The time period between two successive transmissions, by the time base circuit, of the first signal is less than a predetermined response time, allocated to the electronic chip to reply to the terminal.

According to a first mode of realisation of this invention, the means of transmitting the second signal to the interface comprises the processing circuit, connected to the time base circuit so as to be able to receive the first signal. The processing circuit interrupts the processing in response to the reception of the first signal, transmits the second signal to the interface and then resumes the processing.

According to a second mode of realisation of this invention, the means of transmitting the second signal to the interface is separate from the processing circuit and includes for example an encoding circuit to convert the first signal, received from the time base circuit, into a signal which can be recognised by the terminal, forming the second signal. As a variant, the time base circuit and the encoding circuit form the same circuit so that the second signal is identical to the first signal.

Preferably, the second signal takes the form of a finite group of bits, such as a byte.

The processing circuit is usually a microprocessor. The time base circuit is therefore connected to a bus of the chip, to which the microprocessor and memories associated with it are also connected. According to the invention, the time base circuit is also connected to the microprocessor by a direct line, which can transmit the first signal of the time base circuit to the microprocessor and connected, in the microprocessor, to an interrupt input.

This invention also concerns a smartcard including the electronic chip as defined above.

According to another aspect of the invention, a method is planned to transmit a restart signal to a terminal from an electronic chip, the said electronic chip comprising a means enabling it to communicate with the terminal and a processing circuit, the method being characterised in that it comprises the following steps: set up a link between the electronic chip and the terminal, generate a first signal from a time base circuit connected to the processing circuit at least one given moment during processing carried out by the processing circuit and transmit to the terminal, in response to the first signal, a second signal with the purpose of indicating to the terminal that the chip is still operating.

Other features and advantages of this invention will appear on reading the detailed description which follows of several modes of realisation made in reference to the attached drawings;

DETAILED DESCRIPTION

Figure 2:
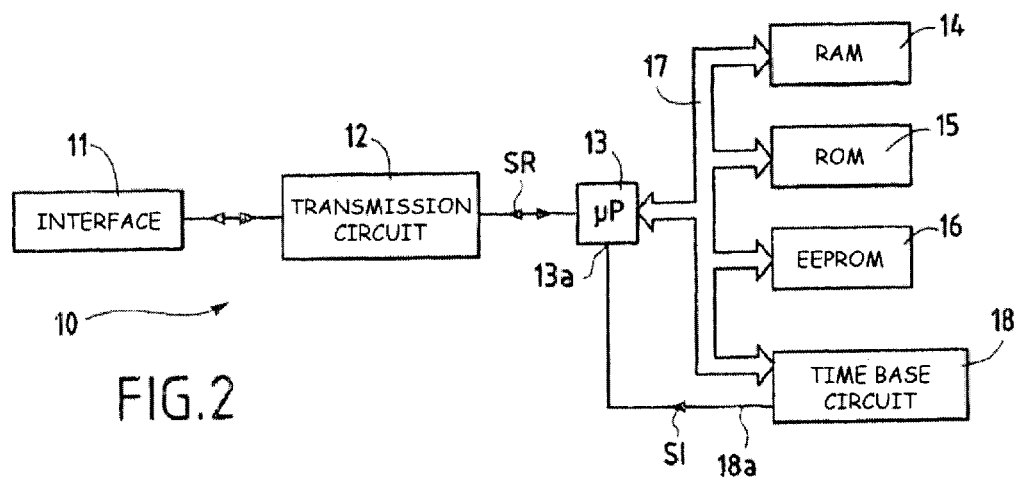
FIG. 2 is a block diagram showing the main electronic circuits of an electronic chip for smartcard, according to a first mode of realisation of the invention.

In reference to FIG. 2, an electronic chip 10 for smartcard according to a first mode of realisation of the invention comprises in particular an interface 11, a transmission circuit 12, a microprocessor 13 and memories 14, 15, 16. The memories 14, 15, 16 consist respectively of a RAM (Random Access Memory), a ROM (Read Only Memory) and an EEPROM (Electrically Erasable Programmable Read Only Memory).

Figure 1:
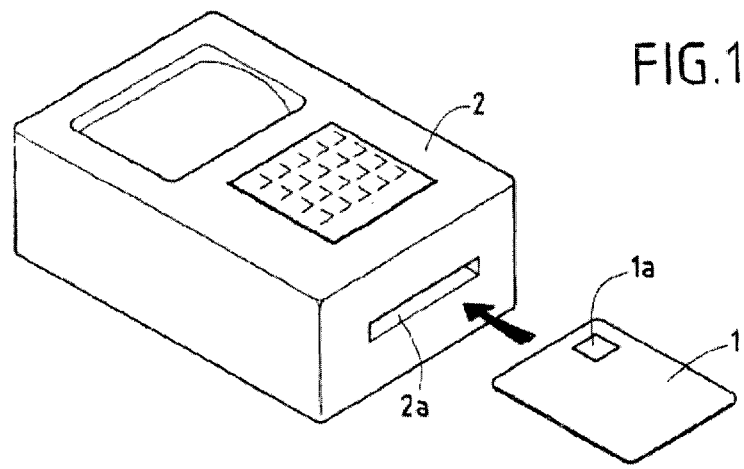
FIG. 1, already discussed, shows a smartcard and a smartcard read terminal.

The interface 11 generally consists of electrical contacts designed to co-operate with the corresponding electrical contacts (not shown) of a smartcard read terminal. As a variant, however, it may comprise radio-frequency transmission/reception means to exchange data with the corresponding transmission/reception means planned in the terminal. The interface 11 is used to set up a link between the terminal and the electronic chip 10, when a smartcard incorporating the said chip 10 is inserted into the terminal as shown on FIG. 1, or moved within the terminal's electromagnetic field.

The transmission circuit 12 manages the communication protocol between the terminal and the chip 10. This circuit is known by those skilled in the art and will therefore not be described in detail.

The purpose of the microprocessor 13 is to execute a chip processing and management program called the "operating system" stored as a source code in the ROM 15. In addition to the basic chip management algorithms, the operating system can implement complex processing operations. These complex processing operations are generally carried out on reception of a command from the terminal. However, the chip could also act actively after a link has been set up with the terminal, to carry out a complex operation on its own initiative.

"Complex operation" means a specific operation whose execution is likely to last longer than the response time allocated to the chip after the command has been sent by the terminal or, when the chip is active after setting up the link between the chip and the terminal. For example, an encryption algorithm to protect secret data contained in the EEPROM 16 could represent such a complex operation. Similarly, a file organisation routine to, for example, update a file tree structure also stored in the EEPROM 16 could take longer to execute than the response time allocated to the chip. The operating system is generally composed of a main program and sub-programs. Each complex operation is implemented by a corresponding sub-program.

The RAM 14 is mainly used for temporary storage of data during execution by the microprocessor 13 of the operating system. The memories 14, 15 and 16 exchange information with the microprocessor via a data bus 17.

According to this invention, the electronic chip 10 also comprises a time base circuit 18, connected to the bus 17 and, via a direct link 18a, directly to the microprocessor 13. The time base circuit 18 is a circuit of known type, for example the circuit "ST 19" manufactured by ST Microelectronics.

A time base circuit is generally able to trigger events at precise times. According to this invention, circuit 18 is used to periodically generate an "interrupt" signal SI, which is sent to the microprocessor 13 via the direct link 18a. The interrupt signal SI typically consists of a finite group of bits such as a byte. The time period between two successive SI signals is noticeably less than the response time allocated to the electronic chip. For example, if the response time allocated to the electronic chip is 1 second, the said period between two successive SI signals could be 900 ms.

The time base circuit 18 is activated by the microprocessor 13 before the start, or at the start, of each complex operation to be carried out and deactivated by the same microprocessor on completion of the said complex operation. During the execution of the complex operation by the microprocessor 13, circuit 18 periodically transmits the interrupt signal SI to an interrupt input 13a of the microprocessor. In response to the reception of the signal SI, the microprocessor 13 immediately interrupts the execution of the complex operation in process and executes a specific interrupt program, also called interrupt routine, commanding the transmission by the microprocessor of a restart signal SR. In compliance with the standard ISO 7816-3, the signal SR takes the form of a byte called a "NULL byte" of hexadecimal value "60". The signal SR is sent to the interface 11 via the transmission circuit 12, to be transmitted to the read terminal of the electronic chip and recognised by it. The terminal then resets the response time allocated to the card and waits for the response again. At the same time, the microprocessor 13 resumes the complex operation. If, on expiry of the time period between two successive interrupt signals SI, the complex operation is not finished, a new interrupt signal SI is transmitted so that the microprocessor sends a new restart signal SR to the terminal, and so on until the end of the complex operation.

Figure 3:
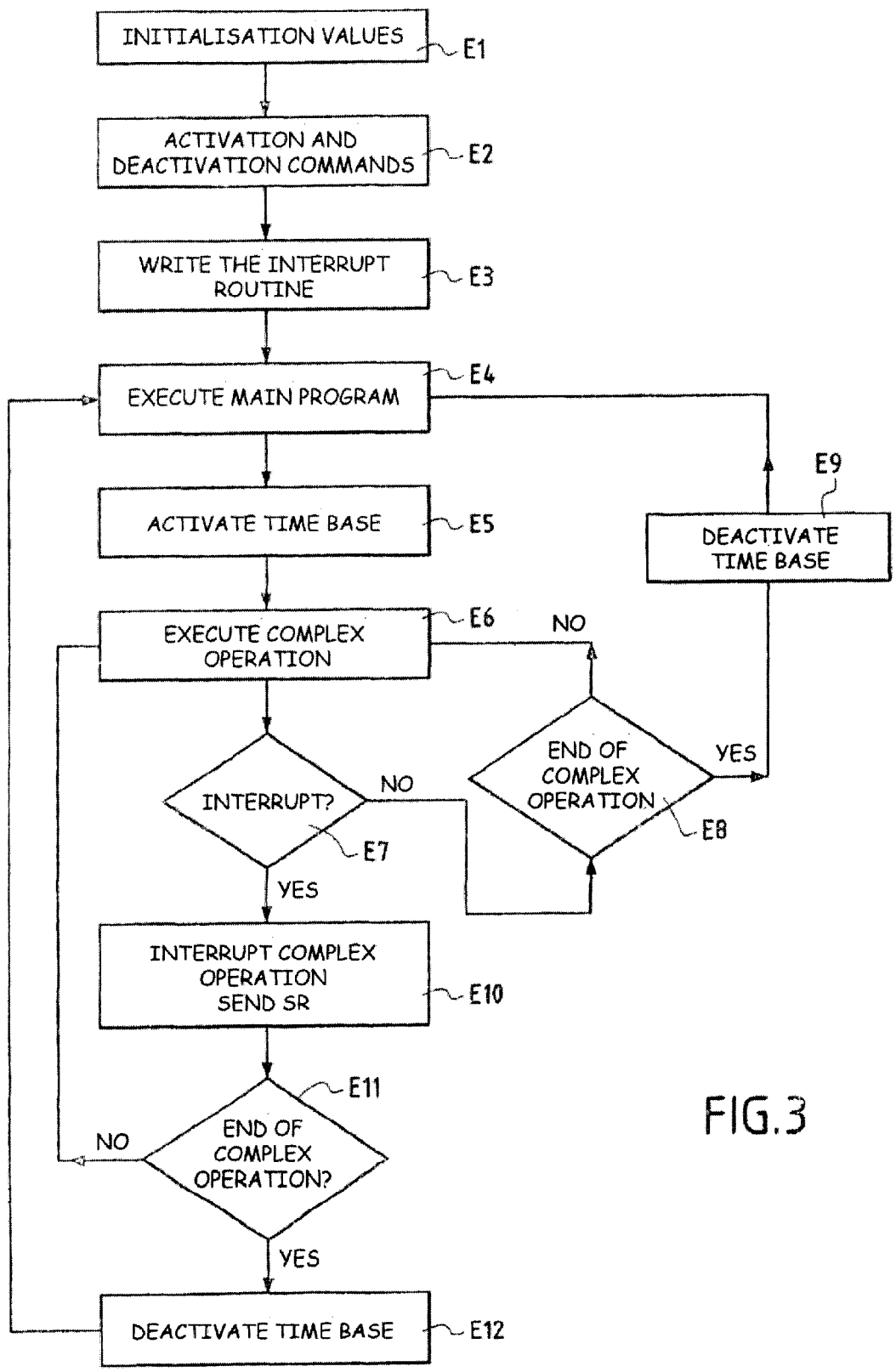
FIG. 3 is a flowchart of a method implemented according to the first mode of realisation of the invention.

FIG. 3 shows in more detail the method implemented according to the first mode of realisation of this invention, and using the electronic chip 10 illustrated on FIG. 2.

Steps E1 to E3 of the method shown on FIG. 3 are carried out before the operating system is installed in the chip 10, i.e. during the actual development of this operating system.

The next steps E4 to E12 are implemented by the microprocessor 13 of the chip 10 after the operating system has been permanently installed in the chip.

In step E1, initialisation values of the time base circuit 18 are entered in the operating system source code. In particular, the time frequency of the circuit 18 is defined so that the time period between two successive interrupt signals SI is noticeably less than the response time allocated to the electronic chip.

In step E2, commands to activate and commands to deactivate the circuit 18 are inserted in the source code of the chip operating system. The activation commands are entered in sections of the source code, each corresponding to the start of a complex processing operation to be carried out by the microprocessor. The deactivation commands are entered in sections of the source code, each corresponding to the end of a complex processing operation.

In step E3, the above-mentioned interrupt routine is written as a sub-program of the operating system. As explained previously, the interrupt routine when it is activated by the main program of the operating system, commands transmission of the restart signal SR to the interface 11.

In step E4, after the smartcard has been inserted in the terminal or the smartcard has been moved through the electromagnetic field of the terminal, the microprocessor 13 like the other circuits in the chip is powered electrically or electromagnetically by the terminal. The microprocessor then executes the main program of the operating system stored in the ROM 15.

In step E5, before starting, for example upon command from the terminal, the execution of a sub-program of the operating system, corresponding to a complex operation, the microprocessor detects an activation command and consequently activates the time base circuit 18 via the bus 17, setting an activation flag in the circuit 18 to "1". The time base circuit 18 so activated can periodically generate the interrupt signal SI according to the time frequency defined in the initialisation values entered in step E2.

In step E6, the microprocessor starts to execute the complex operation.

In step E7, the microprocessor polls its interrupt input 13a. If no interrupt signal SI has reached the input 13a and if the complex operation is not yet finished (step E8), operation continues at step E6. If at step E8 the complex operation is finished, the microprocessor deactivates the time base circuit 18 by setting the activation flag to "0" (step E9) and returns to the main program of the operating system (step E4).

If, on the contrary, input 13a has received an interrupt signal SI, the microprocessor 13 interrupts the complex operation (step E10). It then executes the interrupt routine described above, to command the transmission by the microprocessor of the restart signal, or byte, SR to the smartcard read terminal.

If in step E11 the complex operation is not finished, the algorithm returns to step E6. If the complex operation is finished in step E11, the microprocessor 13, detecting a deactivation command in the source code, deactivates the time base circuit 18 by setting its activation flag to "0" (step E12) then returns to the main program of the operating system (step E4).

Thus, according to the invention, the moments when the restart signal SR is sent to the terminal are determined by the time base circuit 18, i.e. a circuit separate from the microprocessor 13. When it is active, circuit 18 periodically transmits the restart signal SR, independently of the complex operation that the microprocessor 13 is in the process of executing. The microprocessor 13 only interrupts the complex operation on an external event, i.e. the transmission of the interrupt signal SI, triggered by the circuit 18. It is therefore possible to define very accurately the moments when the restart signal SR must be sent to the terminal, so that there is no risk of the terminal switching off the chip power supply because the authorised response time has been exceeded.

Figure 4:
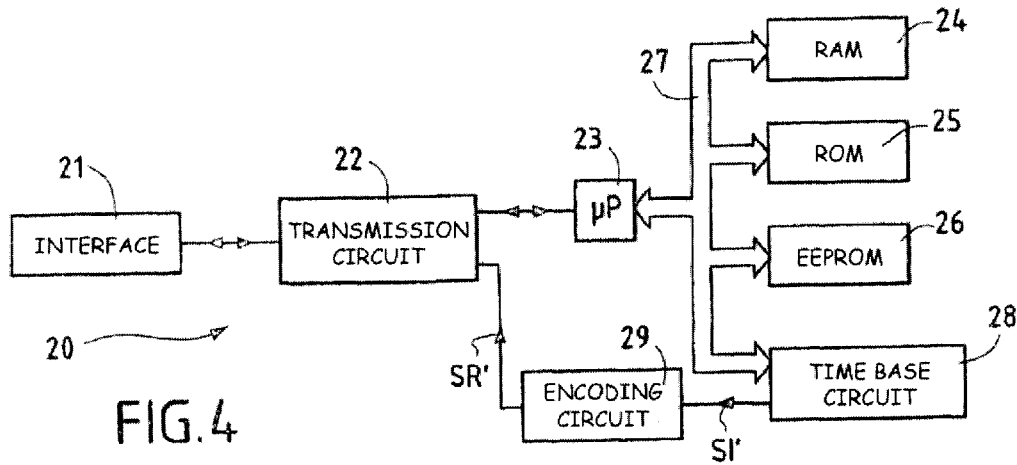
FIG. 4 is a block diagram showing the main electronic circuits of an electronic chip for smartcard, according to a second mode of realisation of the invention.

FIG. 4 represents an electronic chip 20 according to a second mode of realisation of this invention. The electronic chip 20 includes in particular an interface 21, a transmission circuit 22, a microprocessor 23 and memories 24, 25, 26. The elements 21 to 26 are identical to elements 11 to 16 illustrated on FIG. 2 and are linked together in the same way.

The main difference between the electronic chip 20 and the chip 10 according to the first mode of realisation of the invention is that the time base circuit 28, identical to the circuit 18 of FIG. 2, is connected to the microprocessor 23 solely via the bus 27, like the memories 24, 25, 26. The direct link 18a between the time base circuit 18 and the microprocessor 13 has therefore been deleted. Circuit 28, however, is connected to an encoding circuit 29, itself connected to the transmission circuit 22.

The microprocessor 23 activates and deactivates the time base circuit 28 at the start and end of a complex operation respectively. During the time when the circuit 28 is active, it periodically generates a signal SI', for example identical to the signal SI of FIG. 2. The signal SI' is received by the encoding circuit 29 and converted into a signal SR' whose format can be recognised by the smartcard read terminal. The signal SR' represents the restart signal intended to indicate to the terminal that the smartcard is still operating, and has the same format as the signal SR of FIG. 2.

In the example shown on FIG. 4, the circuits 28 and 29 are separate from each other. As a variant, however, they could be combined in a single circuit generating the restart signal SR'.

Chip 20 according to the second mode of realisation offers the advantage, as compared with the first mode of realisation, that a restart signal can be transmitted without interrupting the execution of the complex operation by the microprocessor 23. In this second mode of realisation, the restart signal is in fact transmitted in parallel with the complex operation.

Figure 5:
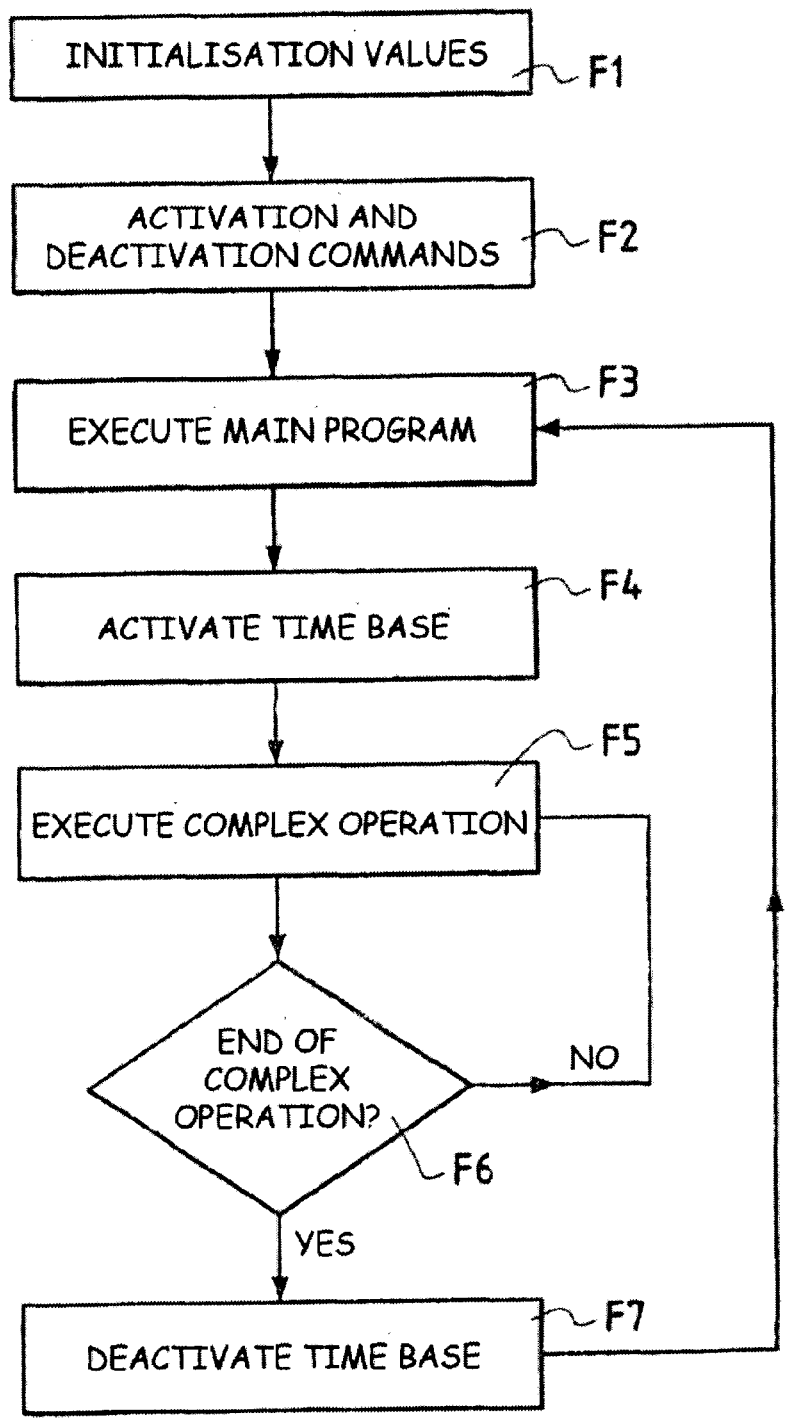
FIG. 5 is a flowchart of a method implemented according to the second mode of realisation of the invention.

FIG. 5 shows in more detail the method implemented according to the second mode of realisation of this invention, and using the electronic chip 20 illustrated on FIG. 4.

Steps F1 and F2 of the method shown on FIG. 5 are carried out before the operating system is installed in the chip 20, i.e. during the actual development of this operating system.

The next steps F3 to F7 are implemented by the microprocessor 23 of the chip 20 after the operating system has been permanently installed in the chip.

The preliminary steps F1 and F2 consist respectively of entering in the operating system of the chip initialisation values of the time base circuit 28 and commands to activate and deactivate this circuit, similarly to steps E1 and E2 of the first mode of realisation.

In the next step F3, when the electronic chip 20 is connected to the terminal by inserting the corresponding smartcard in it or by moving the smartcard through the electromagnetic field of the terminal, the microprocessor 23 executes the main program of the operating system.

In a step F4, before starting to execute a sub-program of the operating system, corresponding to a complex operation, the microprocessor detects an activation command and consequently activates the time base circuit 28 via the bus 27, setting an activation flag in the circuit 28 to "1".

In a step F5, the microprocessor starts to execute the complex operation.

When the complex operation is finished (steps F6, F7), the microprocessor deactivates the time base circuit 28 and returns to the main program of the operating system (step F3).

During the time when the time base circuit 28 is active, i.e. between steps F4 and F7, it periodically transmits the signal SI' to the encoding circuit 29. In response to reception of the signal SI', the encoding circuit 29 transmits the restart signal SR' to the interface 21 via the transmission circuit 22.

This invention has been described above purely as an example, within the context of a smartcard. However, it will be clear to those skilled in the art that the electronic chip according to the invention can be associated with other portable objects such as a plug-in card or a ring.

What is claimed is:

1. An electronic chip comprising an interface enabling the electronic chip to communicate with a terminal, and a processing circuit capable of performing processing after a link has been set up between the chip and the terminal, wherein the electronic chip also comprises:
   a time based circuit, connected to the processing circuit, for generating a first signal during at least one given moment if processing has not yet been completed at the said moment, and
   a means of transmitting to the interface, in response to the first signal, a second signal with the purpose of indicating to the terminal that the chip is operating.

2. An electronic chip according to claim 1, wherein the processing circuit is adapted to activate the time based circuit at the start of the said processing.

3. An electronic chip according to claim 1, wherein the processing circuit is adapted to deactivate the time based circuit at the end of the said processing.

4. An electronic chip according to claim 1, wherein the time based circuit is adapted to generate the first signal periodically.

5. An electronic chip according to claim 4, wherein the time period between two successive transmissions, by the time based circuit of the first signal is less than a predetermined response time, allocated to the electronic chip to reply to the terminal.

6. An electronic chip according to claim 1, wherein the said means of transmitting the second signal to the interface comprises the processing circuit, connected to the time based circuit so as to be able to receive the first signal.

7. An electronic chip according to claim 6, wherein the processing circuit is adapted to interrupt the processing in response to the reception of the first signal, to transmit the second signal to the interface and then resume the processing.

8. An electronic chip according to claim 1, wherein the said means of transmitting the second signal to the interface is separate from the processing circuit.

9. An electronic chip according to claim 8, wherein the said means of transmitting the second signal to the interface comprises an encoding circuit to convert the first signal, received from the time based circuit, into a signal which can be recognised by the terminal, forming the second signal.

10. An electronic chip according to claim 1, wherein the processing circuit is a microprocessor.

11. An electronic chip according to claim 1, wherein the time based circuit is connected to a bus of the chip, to which the microprocessor and memories associated with the microprocessor are also connected and in that the time based circuit is also connected to the microprocessor by a direct line, which can transmit the first signal of the time based circuit to the microprocessor and connected, in the microprocessor, to an interrupt input.

12. An electronic chip according to claim 1, wherein the microprocessor is programmed to execute an interrupt routine, in response to the reception of the first signal, to interrupt the processing.

13. An electronic chip according to claim 1, wherein the processing circuit is adapted to carry out the processing in response to a command sent by the terminal.

14. Smartcard comprising an electronic chip comprising an interface enabling the electronic chip to communicate with a terminal, and a processing circuit capable of performing processing after a link has been set up between the chip and the terminal, wherein the electronic chip also comprises:
   a time based circuit, connected to the processing circuit, for generating a first signal during at least one given moment if processing has not yet been completed at the said moment, and
   a means of transmitting to the interface, in response to the first signal, a second signal with the purpose of indicating to the terminal that the chip is operating.

15. A method to transmit a restart signal to a terminal from an electronic chip, the said electronic chip comprising a means enabling the said electronic chip to communicate with the terminal and a processing circuit, the method being wherein it comprises the following steps:
   set up a link between the electronic chip and the terminal,
   generate a first signal from a time based circuit connected to the processing circuit during at least one given moment during a processing carried out by the processing circuit, and
   transmit to the terminal, in response to the first signal, a second signal with the purpose of indicating to the terminal that the chip is operating.

* * * * *